Nov. 5, 1946.  G. SMITH  2,410,754

SELF-DUMPING PAN

Filed Aug. 17, 1942  7 Sheets-Sheet 1

Inventor
Gilbert Smith,
By Ralph Y Bassett
Attorney

Nov. 5, 1946.  G. SMITH  2,410,754
SELF-DUMPING PAN
Filed Aug. 17, 1942  7 Sheets-Sheet 3

Inventor
Gilbert Smith,
By Ralph J Bassett
Attorney

Nov. 5, 1946.　　　　　G. SMITH　　　　　2,410,754
SELF-DUMPING PAN
Filed Aug. 17, 1942　　　　　7 Sheets-Sheet 4

Inventor
Gilbert Smith,
By Ralph J. Bassett
Attorney

Nov. 5, 1946.　　　　　G. SMITH　　　　　2,410,754
SELF-DUMPING PAN
Filed Aug. 17, 1942　　　7 Sheets-Sheet 7

Inventor
Gilbert Smith,
By Ralph T Bassett
Attorney

Patented Nov. 5, 1946

2,410,754

UNITED STATES PATENT OFFICE 2,410,754

SELF-DUMPING PAN

Gilbert Smith, Fayetteville, W. Va.

Application August 17, 1942, Serial No. 455,091

11 Claims. (Cl. 298—4)

This invention relates to improvements in self-dumping pans or boxes such as used in my Patent No. 2,138,750 dated November 29, 1938, and application Serial No. 356,879 filed September 14, 1940.

The main object of this invention is to construct a pan or box for use in handling coal and like material in conjunction with an unloading apparatus and in which the dumping operation is entirely automatic.

Another object is to construct a dump box or pan in such a manner that the drop doors are capable of assuming closed position after dumping by virtue of cooperation with portions of the unloader platform.

Other objects reside in constructing an assembly of the type in question in which maximum capacity is obtained with extremely low side walls and further to secure automatic discharge of the entire lading without aid of auxiliary means.

Still further objects reside in such structural details as contribute to the strength and rigidity of the assembly, without use of expensive expedients in structure or assembly.

Other objects will more clearly hereinafter appear by reference to the accompanying drawings forming a part of the specification and wherein like characters of reference designate corresponding parts throughout the several views in which.

Figure 1:
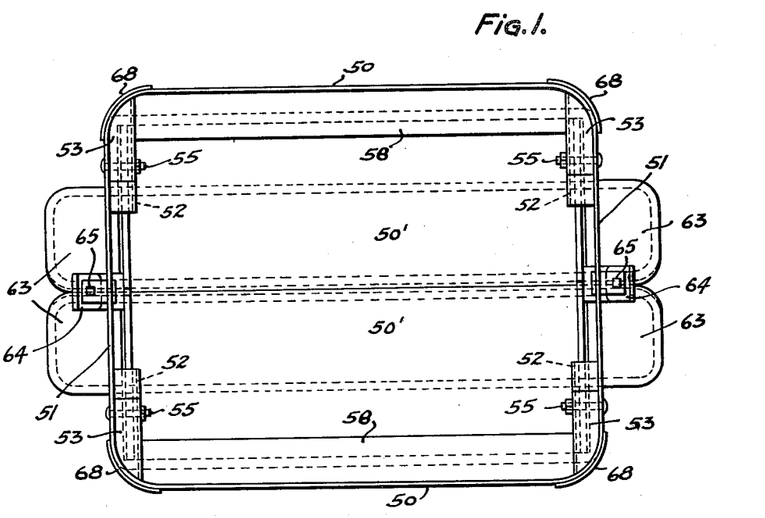
Fig. 1 is a top plan view of my pan in its preferred embodiment.
Figure 2:
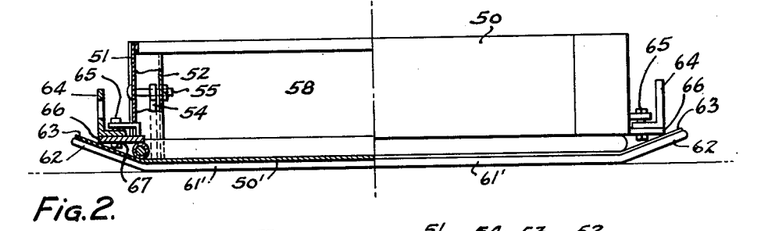
Fig. 2 is a side elevation partly in section of Fig. 1.
Figure 3:
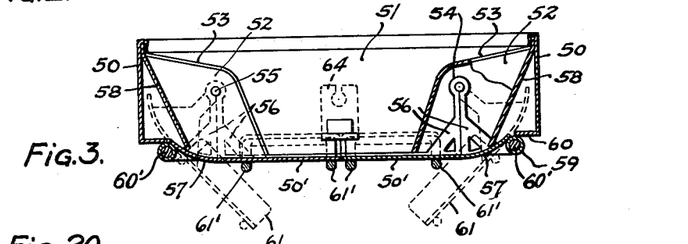
Fig. 3 is a transverse section.

With reference now to Figures 1, 2 and 3 there is illustrated my preferred form of dump box or pan. This pan is known as the clam shell type and includes side walls 50 and end walls 51. At each inner corner of the box there is provided a housing for enclosing a hinge for support and movement of the bottom sections. The shape, construction and arrangement of these hinge housings is best illustrated in Fig. 3 and it will be seen from this figure that they are each formed of angular top plates 53 which project from the end walls 51, at their junction with the side walls 50 extending inwardly and downwardly to terminate flush with the bottom edge of the side and end walls. The side plates 52 of the housings are parallel to the flat portions of the end walls 51, and are each sufficiently spaced from its adjacent end wall portion to provide for the proper arrangement of the hinges therein. The side walls 52 are preferably formed as an integral part of the angular top plates 53 although the specific mode of fabrication may not be of importance. Within these pockets are suspended the hangers or hinges 54. The upper ends of the hangers or hinges are mounted on the pins or bolts 55 which constitute pivots therefor, and the lower ends are flared to provide relatively large faces for attachment to the door sections. The enlarged free ends 56 of the hinges are curved to conform to the door surface 57 to which they are attached and are secured to such faces by riveting or welding as may be desired. It will be noted that the pivot pins 55 extend transversely of the housings, through the side walls 52 of same and through the adjacent end walls 51 of the pan and are removable to permit repair and interchange of these hinge parts.

The hangers 54 have their pivotal mountings 55 positioned inward of the side walls 50 and upward of the bottom surface, the location being determined by the size and curvature of the door sections 50' and its structure with respect to the other portions of the assembly whereby the desirable movement is obtained. Inasmuch as the bottom door sections with the illustrated suspension will partially swing upward within the confines of the side walls 50, it is essential that provision be made to protect these doors from contact with the lading, in order that their movements may be entirely free. To provide for this the deflector plates 58 are shown arranged inward of each side wall 50, the deflector plates being flanged under the upper marginal edge of the adjacent scoop structure and being inclined downwardly and inwardly to a point positioned inwardly of the reinforced longitudinal edges 59 defining the inner extremity of the horizontal flanges 60 of the side walls. This arrangement of the deflector plates 58 provides compartments of sufficient capacity to freely receive the curved outer edge portions of the bottom door sections 50' during their opening movement. It will also be noted that the deflector plates have a twofold function in that they not only provide one wall of each door housing but also during unloading of the scoop facilitate the discharge of the lading. In Fig. 3 I have illustrated in dotted line at 61 the position assumed by the hinged door. It will be noted that this door drops materially below the normal bottom line of the pan while unloading.

Figure 20:
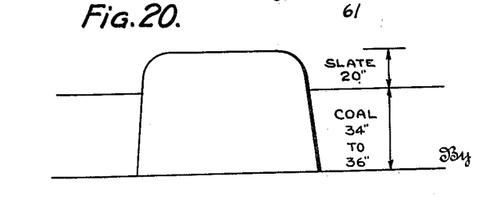
Fig. 20 is a diagrammatic transverse elevation to illustrate coal and slate seams.

Referring now to the details of construction of the pan of Figs. 1, 2 and 3, it will be noted that the marginal edges of the horizontal flanges 60 are substantially beaded at 59 and reinforced by door hinge rod 60' which support in hinged relation the door sections 50'. It will also be noted that the runners 61', each of which is in rectangular form, are arranged with their adjacent central longitudinal runner portions substantially near the inner free edges of the door sections 57, while their outer longitudinal runner portions are so positioned as to be free from contact with parts of the pan during the dumping operation. The ends of the runners 61' extend beyond the ends of the pan or box and are bent upwardly as at 62 to permit free drag in either direction. Plates 63 are positioned over the extending runner ends as best shown in Fig. 1. Centrally at each end of the dump pan are the angular pivoted cable grips 64 horizontally pivoted by means of pins 65 to the fixed plates 66. The plates 66 are welded or otherwise secured to such portions of the pan structure as the end walls 51, end bead 59, or cross brace 67 as best shown in Fig. 2. It will be noted by reference to Fig. 1 that the corners of the pan are curved to aid in its travel under urge of the cable mechanism, and these curved corners are braced and reinforced by the curved corner plates 68. In Fig. 20 there is shown in section the type of mine structure in which the present development is particularly adapted. In this disclosure it will be noted that the coal seam is indicated and above the coal seam is the slate structure. Obviously, the less of this slate which may have to be removed to permit the use of the present unloading apparatus, the more profitable will be the mining operation. It therefore, follows that by using the pan illustrated in Figs. 1, 2 and 3 much labor in the mine is eliminated and the profits of those concerns in the mining operation may be materially increased.

Figures 4, 6:
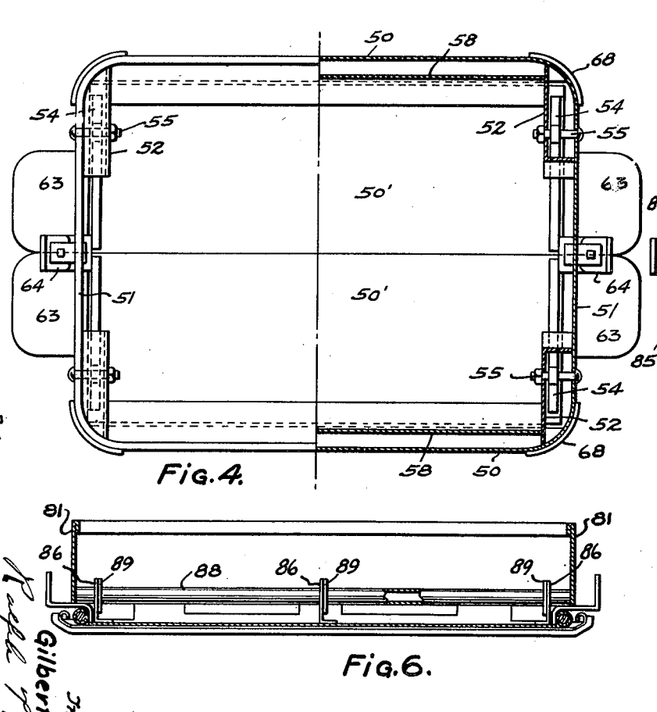
Fig. 4 is a top plan view of the modification of Fig. 1, with one-half in horizontal section.
Fig. 6 is a longitudinal section of the form shown in Fig. 5.
Figures 5, 7:
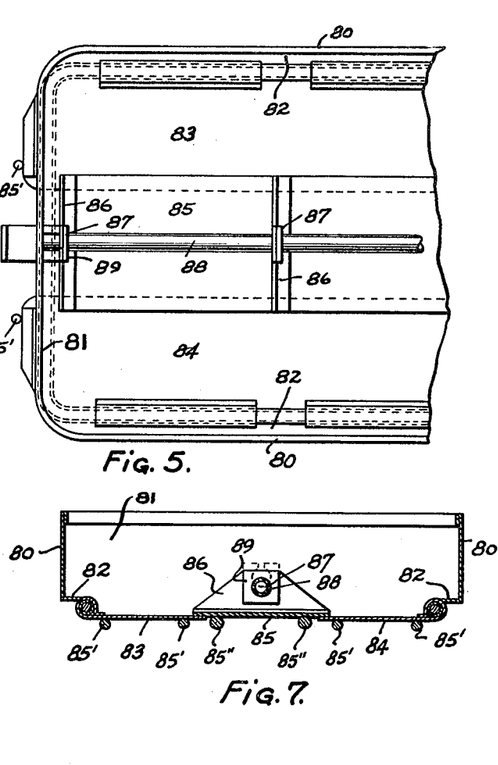
Fig. 5 shows a partial top plan view of a modified form of scoop including the use of three doors.
Fig. 7 is a transverse section.

Figs. 5, 6 and 7 illustrate a modified form of scoop or pan, in which the bottom is formed of three hinged door sections.

In these figures the scoop is of the three door type and as in other instances it includes the side walls 80 and end walls 81. These walls are flanged inwardly at 82 and to the longitudinally flanged side edges are hinged the drop door sections 83 and 84. The door sections 83 and 84 comprise substantially two-thirds of the lading bottom of the pan and cooperate with a central door section 85 to complete the bottom closure. The central door section 85 has its ends flanged upwardly at 86 and centrally perforated at 87 to receive trunnions 88 which extend from the end walls 81. These portions may be suitably reinforced by adjacent plate sections illustrated at 89, the purpose being to provide suitable supporting trunnions for the free swinging movement of the intermediate door section 85.

It will be noted that the door sections overlap and that therefore, the elevation of the sections vary in accordance with the overlapped arrangement. To accommodate for this the runners 85' on the different doors will be of relatively different diameter in order to bring the bottom horizontal ground engaging line to a common plane. In the invention shown in Figs. 5, 6 and 7 the central door section 85 being slightly elevated above the outer hinged sections 83 and 84 necessitate the use of the relatively thick runners 85".

Figure 8:
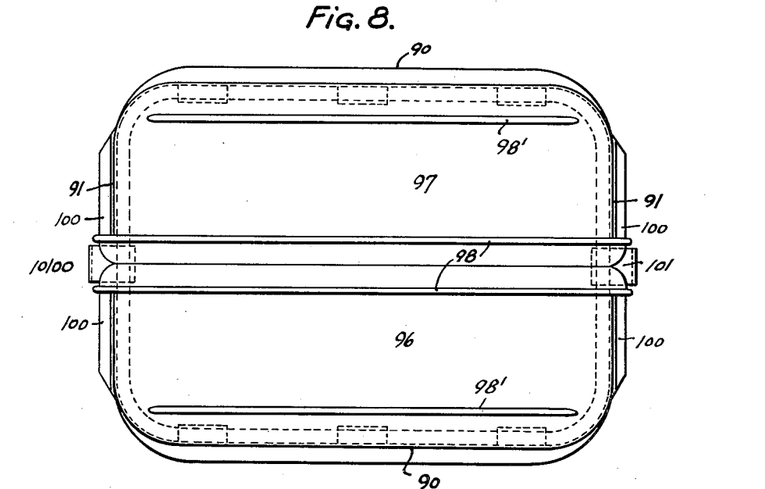
Fig. 8 is a plan view of another pan modification.
Figure 9:
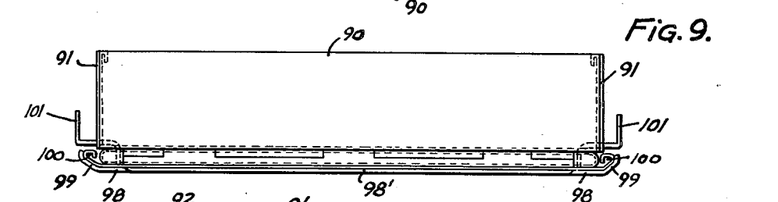
Fig. 9 is a side elevation of the pan of Fig. 8.
Figure 10:
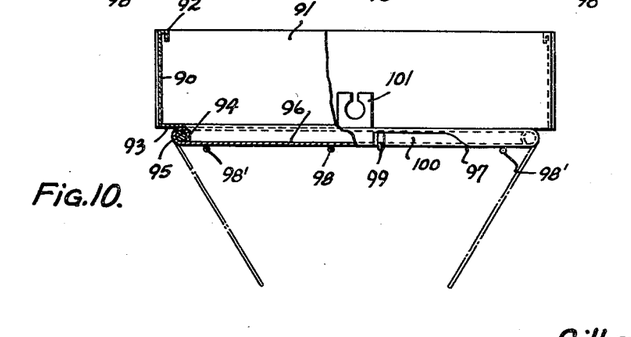
Fig. 10 is an end elevation of Fig. 8 partly in section.
Figure 11:
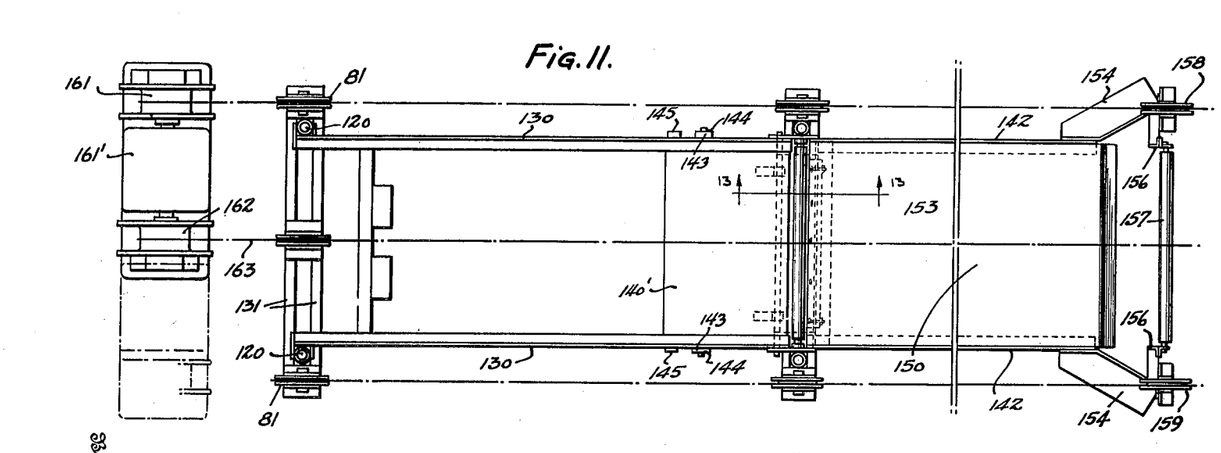
Fig. 11 is a top plan of an unloader platform.

The pan shown in Figs. 8, 9, and 10 represents an improvement over that pan disclosed in my prior Patent No. 2,138,750 dated November 29, 1938. This pan is of relatively low structure including side walls 90 and end walls 91 all of which are reinforced at their upper edges by inturned flanges 92 as shown in Fig. 9. The marginal portion of the bottom 93 is rigid with the side walls and is bent downwardly at 94 to form portions of elongated hinged barrels, which latter are completed by the roller edges 95 of the bottom plates 96 and 97. To the bottom plates 96 and 97 are fixed the runners 98 and 98' being bent upwardly at their extremities 99 to extend about and reinforce the beaded edges 100 of the bottom end portions. Cable couplings 101 are provided at each end of the pan.

Figure 12:
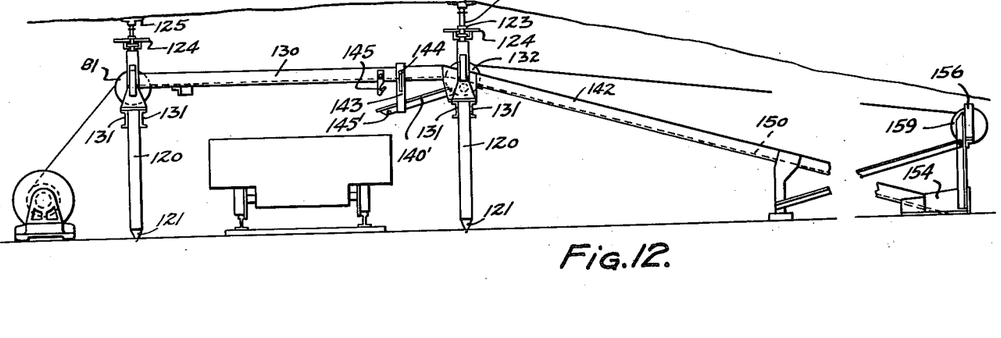
Fig. 12 is a side elevation of Fig. 11.
Figure 13:
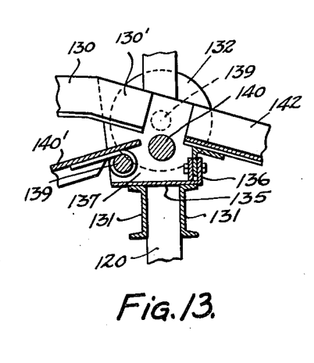
Fig. 13 is a sectional view on line 13—13 of Fig. 11.
Figure 14:
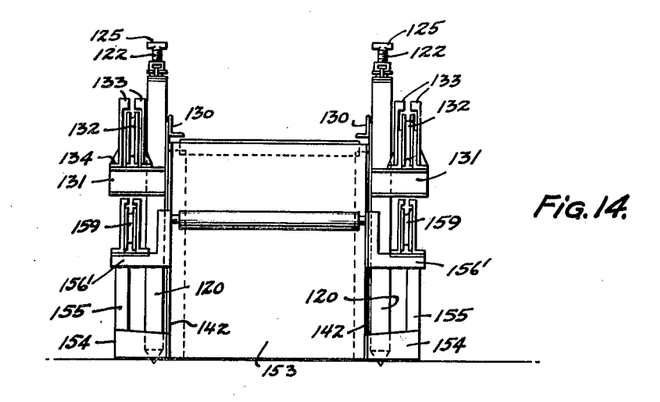
Fig. 14 is a front end elevation of the structure of Figs. 11 and 12.
Figure 15:
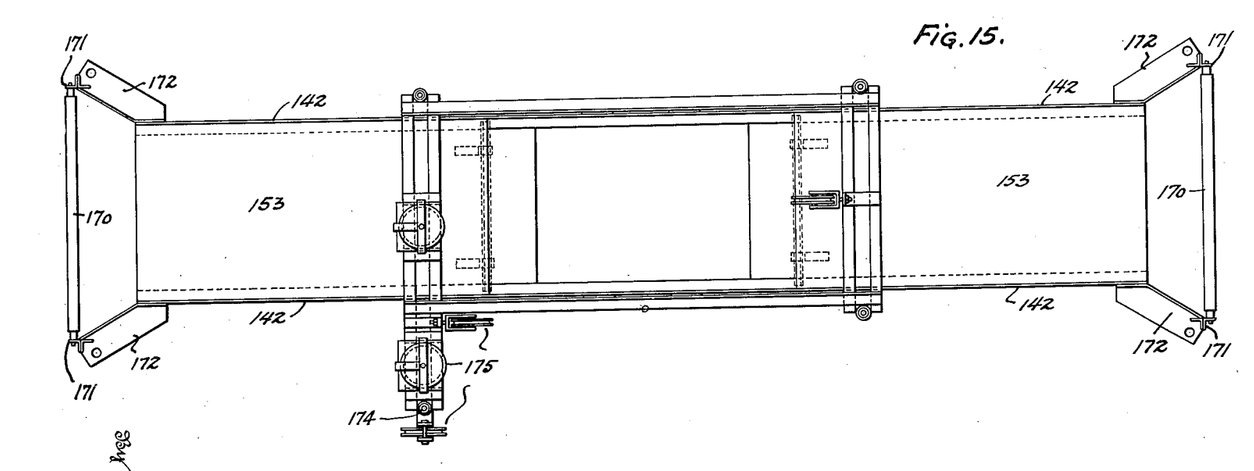
Fig. 15 is a top plan of a modified form of double ramp dump.
Figure 19:
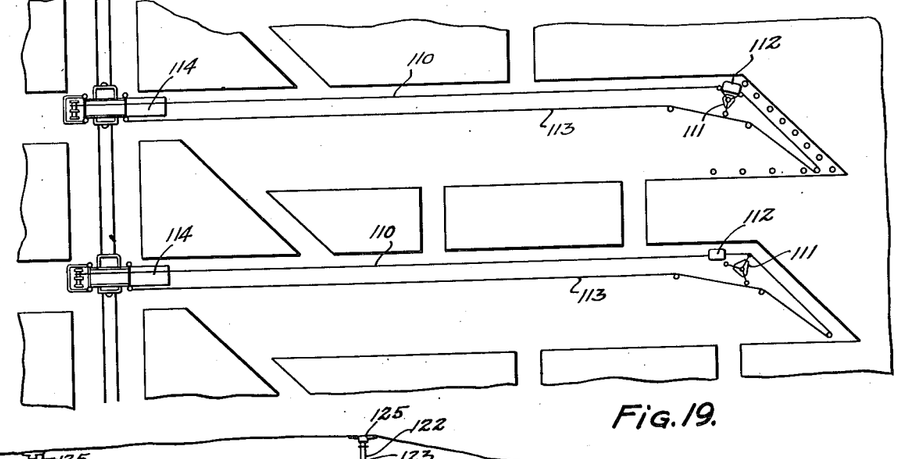
Fig. 19 is a detail plan view of a single ramp dump layout with the invention of Fig. 12 illustrated.

The deflector 111 for handling the car loader or pan, forming the subject-matter of my application Serial No. 356,879 filed September 14, 1940, is adaptable for use in many types of mines and is primarily designed to eliminate trackage and permit substantially closer timbering than is practical with other mechanical methods of loading. Figure 19, illustrates a single track entry layout in which the head rope is indicated at 110, deflector at 111, the pan passing around the deflector at 112 and the tail rope 113. The ropes or cables 110, 113 extend to the dump assemblies indicated generally at 114. These dump assemblies including the cable connections are shown in detail in Fig. 12.

Referring now to Figs. 11, 12, 13 and 14, it will be seen that the elevated frame beneath which the cars are shuttled and from which the pans are discharged includes adjustable uprights or posts 120, in the present instance two being positioned for supporting the forward end of the horizontal tracks forming the unloading stand and two being positioned to support the rear end of the same. Each of the posts includes a stake or jack of somewhat the same type as utilized in the deflector structure in that the lower end of the base portion is pointed as at 121 to readily secure the necessary footing. The upper end is provided with the adjustable threaded screw 122 actuated by the nut 123 provided with operating handles 124. The screw 122 carries the swivelled plate 125 for engaging the mine ceiling and the structure of this plate may be modified in accordance with requirements. Thus it will be seen that the main supporting elements are provided for quick assembly and disassembly. The tracks of inturned angles 130 are clamped, bolted, welded or otherwise secured to the uprights 120 at a suitable elevation and likewise the transverse supporting opposed channels 131 are secured to each pair of posts below the angle 130 and extend laterally of the posts to provide supporting arms for the pulleys 132, which latter are mounted in the supporting frame 133 and secured in position by suitable means securing the transverse support 131 and the flanges 134. The supporting structure between each pair of posts includes the opposed channels 131, heretofore mentioned, upon which is secured the plate or cap 135 (see Fig. 13). This plate 135 is bent upward at its front edge 136 and at each end 137, the former bent up portion on vertical flange 136 being the securing means for the ramp and the end plates 137 being used to mount the hinge pin 139 and the supporting roller 140. The roller 140 is interposed between the downwardly bent ends 130' of the side rails or angles 130 and the upper end of the ramp supports 142 and operates as a transfer medium between these parts and for the loader pan shown. The hinge pin 139 supports the vertically adjustable plate 140' which functions as the control member for the hinged bottom plates of the pan. Side supports 143 are adjustably carried by the angle members 130 by means of the slot and bolt connection 144 and a latch 145 cooperating with a pin 145' on the plate 140' to secure the parts in their upper position when desired.

At the entrance end of the horizontally arranged unloader frame there is provided the inclined ramp 150 which terminates adjacent the angular ends 130' of the horizontal angles 130 and comprises inturned side angles 142 with connecting plates 153 along which the pan travels in its movement to the horizontal frame 130 from which the load in the pan is discharged. The ramp is formed of such a length as to provide a suitable angle for proper manipulation of the pan, the lower end being anchored by means of the outwardly flared anchor plates 154. Adjacent the outer ends of the anchor plate and inward of the same are the uprights 155 and 156 formed of joined angles and between which is journalled the guide roller 157 at a proper height to provide the necessary clearance for the pan and engage the manipulating cable. The standards 155 and 156 which support the roller 157 are of angle form with one arm of each outturned to provide a shelf 156' upon which the cable guides or pulleys 158 and 159 are supported. These pulleys are in vertical alignment with the pulley 132 and in longitudinal alignment with the pulley 81 whereby the operating cable is maintained in proper alignment for operation of the pan. At the junction of the inclined ramp 150 and the horizontal guide rail 130 is the transverse guide roller 140 which cooperates with the roller 157 heretofore described in the operation of the apparatus. The rollers 157 and 158 align the cable 159 with the windlass 161 driven by the motor 161'. The motor 161' is provided with the return pulley 162 which receives the cable 163.

Figure 16:
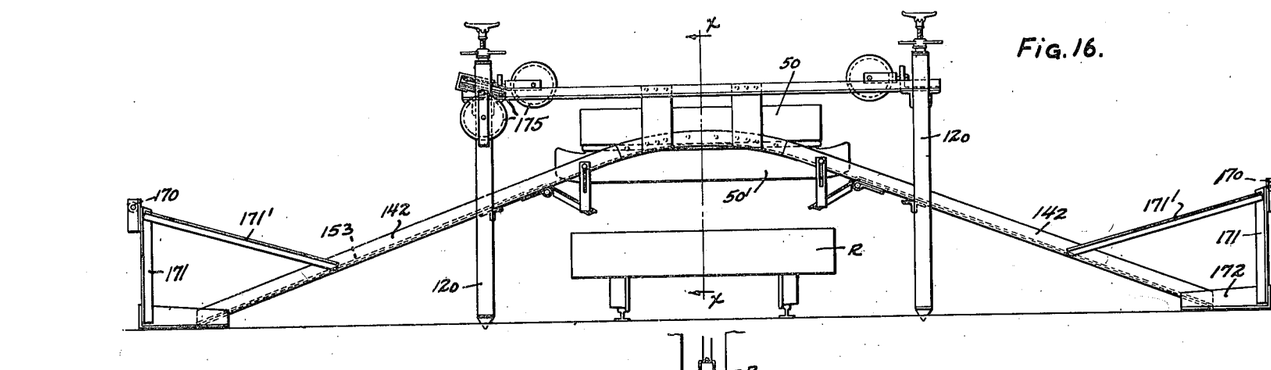
Fig. 16 is a side elevation of the structure of Fig. 15.
Figure 17:
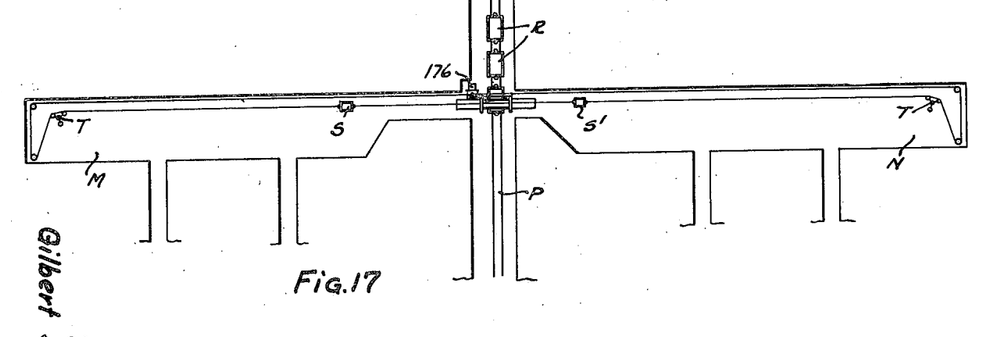
Fig. 17 is a room layout showing the use of the double ramp dump.
Figure 18:
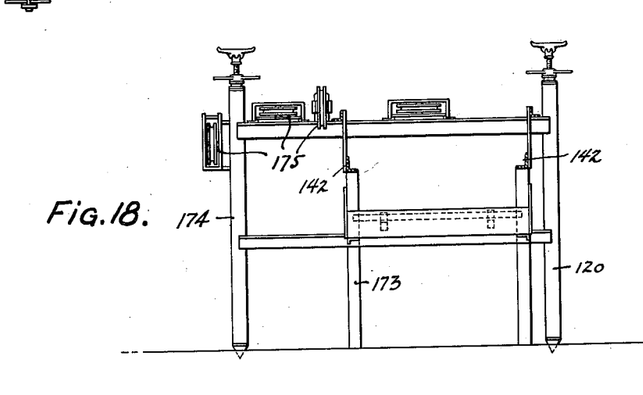
Fig. 18 is a section on line x—x of Fig. 16.

Referring now to Figs. 15, 16, 17 and 18 there is illustrated a two-way ramp or unloader mechanism, which by reference to Fig. 17 is capable of accommodating pans or buckets travelling from opposed cuts M, N at each side of the transversely arranged rails P. It will be noticed that the cars R travel on the rails P beneath the two-way ramp, this arrangement being more clearly illustrated in Fig. 16. In Fig. 16 a pan of the type illustrated in Figs. 1, 2 and 3 is shown in unloading position, the side walls 50 of the pan and the drop doors 50' being clearly shown, with the doors in their lowered or discharge position. The cable arrangement necessarily differs from the cable arrangement in the single dump set-up, however, such cable arrangement is generally illustrated in diagrammatic manner in Fig. 17 in which the pans are illustrated at S, S', the pan S moving toward the unloader and the pan S' moving towards the deflector T. The structure of the two-way ramp or unloader set-up is in substance the same as that in the single unloader set-up of Figs. 11, 12, 13, 14 and 19 in that the adjustable stakes 120 are utilized for positioning the apparatus and the ramp includes the side angles 142 and the connecting sheets 153. Guide rollers 170 at each end of the ramp are supported by the uprights 171 formed of suitable angles and constituting footing for the laterally extending angular brace sheets 172. In this assembly there is an intermediate support 173 for one end of the unloader section of the ramp to permit offset arrangement of the adjustable stake 174 for the accommodation of the multiple pulley set-up 175 essential to proper connection with the windlass illustrated diagrammatically at 176 in Fig. 17. The connection of the cable with the windlass and with the pans, including their cooperation with the deflectors and guide stakes is also illustrated in this figure. By the arrangement of ramp shown, it will be apparent that a substantially continuous loading and unloading of the pan may be accomplished from two opposed cuts and by means of a single power set-up using a continuous cable. While one pan is being unloaded the other is in loading position at the end of the cut and this arrangement could be modified to use additional pans on the same cables although such an arrangement is not illustrated. It will be noted that the support for the guide rollers 170 is somewhat modified or simplified at each end of the ramp elements 142 in that angle structures are used for the uprights 171 which uprights are braced by the angle structures 171 connected intermediate the ramps. The deflecting braces 172 constitute also braces for the uprights 171 and perfect a rigid but inexpensive structure. The ramp assembly and the parts constituting the same are connected by separable connections such as bolts where the parts are to be separated during assembly and disassembly. It is also contemplated that the dual ramp arrangement may be applied to the single ramp arrangement by duplicating the ramp end of the dump.

What I claim as new and useful and desire to secure by Letters Patent is:

1. A mine scoop including side and end walls, and a bottom, said bottom including hinged sections, the outer sections of said bottom being swingingly suspended by hangers the upper ends of which are pivoted to supports located intermediate the vertical height of said end walls, and deflector plates in said scoop forming with said side walls compartments to receive said outer swinging bottom sections when in their elevated position.

2. A mine scoop including side and end walls, rigid bottom sections adjacent the side walls, and hinged bottom sections, said hinged bottom sections including pivoted hangers fixed to the end wall at a position permitting the said bottom sections to swing inwardly of the side walls, and hoods extending from the end walls and enclosing said hangers.

3. A mine scoop including side and end walls, a sectional bottom, hinged hangers for said sectional bottom fixed to the end walls, inclined deflector sheets projecting downwardly and inwardly of the side walls for enclosing said bottom sections when in their dumped position, and hoods for said hangers.

4. A mine scoop including side and end walls, a bottom, said bottom including a plurality of sections, certain of said sections being hinged inward of the lower marginal edges of said side walls, an additional bottom section hinged with its axis extending from end to end of said scoop and arranged intermediate the side walls, and individual runners for each bottom section including spaced central portions and upturned extremities.

5. A mine scoop including side and end walls, rigid bottom sections extending inwardly from the side walls, and hinged bottom sections swinging downwardly from said rigid bottom sections, runners for each hinged bottom section, said runners each including a pair of spaced runner elements and said runner elements being each of a thickness to engage a surface in a common horizontal plane regardless of the relative elevation of the respective door sections.

6. A mine scoop including side and end walls, said side and end walls being formed with upper and lower marginal reinforcing portions, downwardly swinging bottom sections hinged inward of the side walls, runners for said bottom sections including elongated spaced parallel runner portions and upturned end portions, said upturned end portions extending beyond the ends of said scoop and having independent overlying fixed plates.

7. A drag scoop comprising a box like assembly having a plurality of horizontally extending downwardly swinging hinged bottom sections, the adjacent free edges of said hinged sections overlapping, runners for said sections, said runners being constructed and arranged so that they will present a ground engaging surface lying in a common horizontal plane, and upturned deflectors at each end of said bottom sections, said upturned deflectors being reinforced by projecting ends of said runners.

8. In a mine scoop including side and end walls, fixed inwardly projecting bottom portions extending from the side walls and terminating in a reinforced beading, said beading extending throughout the length of said fixed side wall portions and being connected by beading extending along the lower horizontal portion of the end walls, deflector plates projecting downwardly and inwardly from the upper longitudinal edges of said side walls, and bottom sections for said scoop, said bottom sections being suspended by hangers fixed to said end walls and including upturned outer marginal portions adapted to be confined between said deflectors and said side walls when said bottom sections are in discharge position.

9. The substance of claim 8 characterized in that hoods extend inwardly and downwardly from the end walls to enclose said hangers.

10. A box type loader for mines comprising side and end walls, fixed bottom portions adjacent the side walls, swinging bottom portions providing a closure between the inner marginal edges of the fixed bottom portions, individual runner secured to said swinging bottom portions, said runners including spaced central portions and upturned extremities, said extremities projecting beyond said end walls and plates fixed to and overlying the projecting portions.

11. A box type loader for mines comprising side and end walls, fixed bottom portions adjacent the side walls, swinging bottom portions having upwardly extending end portions hinged to said fixed bottom portions adjacent their inner edges to provide a closure between said fixed bottom portions, and runners secured to the swinging bottom portions, said runners extending longitudinally of the bottom and having their extremities bent upwardly against said upwardly extending end portions.

GILBERT SMITH.